(12) United States Patent
Moriki et al.

(10) Patent No.: US 9,249,557 B2
(45) Date of Patent: Feb. 2, 2016

(54) WORK VEHICLE

(75) Inventors: Hidekazu Moriki, Tokyo (JP); Satoru Kaneko, Tokyo (JP); Takashi Ikimi, Hitachi (JP); Noritaka Ito, Ushiku (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 97 days.

(21) Appl. No.: 14/237,014

(22) PCT Filed: Aug. 15, 2012

(86) PCT No.: PCT/JP2012/070748
§ 371 (c)(1),
(2), (4) Date: Feb. 4, 2014

(87) PCT Pub. No.: WO2013/024868
PCT Pub. Date: Feb. 21, 2013

(65) Prior Publication Data
US 2014/0188320 A1    Jul. 3, 2014

(30) Foreign Application Priority Data
Aug. 16, 2011 (JP) ................. 2011-178152

(51) Int. Cl.
*E02F 9/22* (2006.01)
*B60K 6/20* (2007.10)
(Continued)

(52) U.S. Cl.
CPC ............ *E02F 9/2246* (2013.01); *B60K 6/46* (2013.01); *B60K 6/52* (2013.01); *B60L 7/14* (2013.01); *B60L 11/005* (2013.01); *B60L 11/123* (2013.01); *B60L 11/14* (2013.01); *B60L 11/1861* (2013.01); *B60L 15/2009* (2013.01); *B60W 10/06* (2013.01); *B60W 10/08* (2013.01); *B60W 10/24* (2013.01); *B60W 10/26* (2013.01); *B60W 10/30* (2013.01); *B60W 20/00* (2013.01); *B60W 30/1886* (2013.01); *B60W 30/1888* (2013.01); *E02F 9/0841* (2013.01); *E02F 9/2075* (2013.01); *E02F 9/2079* (2013.01); *E02F 9/2095* (2013.01); *E02F 9/2235* (2013.01); *E02F 9/2296* (2013.01); *B60L 2200/40* (2013.01); *B60L 2210/10* (2013.01); *B60L 2210/40* (2013.01); *B60L 2220/42* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2250/24* (2013.01); *B60L 2260/28* (2013.01); *B60W 20/1088* (2013.01);
(Continued)

(58) Field of Classification Search
None
See application file for complete search history.

(56) References Cited

FOREIGN PATENT DOCUMENTS

| JP | 2007-247230 | 9/2007 |
|----|-------------|--------|
| JP | 2007-290607 | 11/2007 |

(Continued)

*Primary Examiner* — John R Olszewski
*Assistant Examiner* — Gerrad A Foster
(74) *Attorney, Agent, or Firm* — Baker Botts L.L.P (57) ABSTRACT

When the total value of demanded hydraulic power and demanded traveling power is larger than the sum of the engine power that can be output by an engine (1) and of the discharge power that can be discharged by an electrical storage device (3), the actual power of a hydraulic pump (9) is increased from the value at the time of demand toward the demanded hydraulic power under the constraint of a predetermined limit. While the power of the hydraulic pump is being subjected to the predetermined limit, the actual power of the traveling motor is decreased from the value at the time of demand by a value smaller than the magnitude of the predetermined limit. This prevents worsening of ride comfort attributable to the distribution of power between the hydraulic pump and the traveling motor.

5 Claims, 5 Drawing Sheets

(51) Int. Cl.

| | | |
|---|---|---|
| *B60L 15/20* | (2006.01) | |
| *B60W 20/00* | (2006.01) | |
| *E02F 9/20* | (2006.01) | |
| *B60K 6/46* | (2007.10) | |
| *B60L 11/00* | (2006.01) | |
| *B60W 10/06* | (2006.01) | |
| *B60W 10/08* | (2006.01) | |
| *B60W 10/24* | (2006.01) | |
| *B60W 10/26* | (2006.01) | |
| *B60W 30/188* | (2012.01) | |
| *E02F 9/08* | (2006.01) | |
| *B60L 7/14* | (2006.01) | |
| *B60L 11/12* | (2006.01) | |
| *B60L 11/14* | (2006.01) | |
| *B60L 11/18* | (2006.01) | |
| *B60K 6/52* | (2007.10) | |
| *B60W 10/30* | (2006.01) | |

(52) U.S. Cl.
CPC .... *B60W2300/17* (2013.01); *B60W 2510/0666* (2013.01); *B60W 2510/09* (2013.01); *B60W 2510/305* (2013.01); *Y02T 10/6208* (2013.01); *Y02T 10/6217* (2013.01); *Y02T 10/6282* (2013.01); *Y02T 10/6286* (2013.01); *Y02T 10/648* (2013.01); *Y02T 10/7005* (2013.01); *Y02T 10/705* (2013.01); *Y02T 10/7022* (2013.01); *Y02T 10/7044* (2013.01); *Y02T 10/7077* (2013.01); *Y02T 10/7216* (2013.01); *Y02T 10/7241* (2013.01); *Y02T 10/7275* (2013.01); *Y10S 903/93* (2013.01)

(56) References Cited

FOREIGN PATENT DOCUMENTS

| JP | 2009-216058 | 9/2009 |
|---|---|---|
| JP | 2009-241830 | 10/2009 |
| JP | 2011-245906 | 12/2011 |

WORK VEHICLE

TECHNICAL FIELD

The present invention relates to a work vehicle. More particularly, the invention relates to the distribution of power during compound motion.

BACKGROUND ART

Among conventional work vehicles, there exists a wheel loader equipped with an engine, a hydraulic pump coupled mechanically to the output shaft of the engine, hydraulic actuators operated with a fluid supplied from the hydraulic pump, and an automatic transmission operating on a torque converter coupled mechanically to the output shaft of the engine (the wheel loader will be called the torque converter-equipped vehicle hereunder). The torque converter-equipped vehicle travels by having the engine power transmitted to its wheels through the automatic transmission, propeller shafts, differential gears, and drive shafts. Also, the torque converter-equipped vehicle has its front mechanism operated by extending and contracting the hydraulic actuators to move a bucket to excavate, load, and haul gravel or the like.

When the torque converter-equipped vehicle travels, the consumed power of the hydraulic pump (power of the load exerted by the hydraulic pump on the engine) may grow and cause the engine power to become insufficient and the engine revolution speed to drop. In such a case, the torque converter has properties to lower its consumed power (power of the load exerted by the torque converter on the engine) automatically. This allows a balance to be reached between the engine power (supplied power) on the one hand and the total power of the hydraulic pump and torque converter (consumed power) on the other hand at a certain operating point of the engine. At this point, the consumed power of the torque converter drops and so does the power for traveling. However, in a transient state where the engine revolution speed is varied, the rotational energy of the engine output shaft works as a buffer that prevents an abrupt drop in traveling power.

In recent years, meanwhile, there have been proposed hybrid construction machines each equipped with an engine, a hydraulic pump coupled mechanically to the output shaft of the engine, hydraulic actuators operated with a fluid supplied from the hydraulic pump, a motor generator coupled mechanically to the engine output shaft, an electrical motor operated by electrical power supplied from the motor generator, and an electrical storage device that exchanges electrical power with the motor generator and electrical motor. This type of hybrid construction machine is constituted as a two-input, two-output system that allows the hydraulic pump and electrical motor to consume power supplied from the engine and electrical storage device. For that reason, power control means to control the distribution of supplied power between the engine and the electrical storage device and the distribution of consumed power between the hydraulic pump and the electrical motor is a critical element in determining fuel efficiency and operational performance.

JP-2007-247230-A discloses a hybrid construction machine which, in order to prevent a deficiency of power, detects the consumed motive power of a hydraulic pump and that of an electrical motor (called the consumed power hereunder) to control the power of the hydraulic pump and electrical motor in such a manner that the total sum of the consumed power detected will not exceed the total supplied motive power (called the total supplied power hereunder) that can be supplied from the engine and electrical storage device.

Also, JP-2009-216058-A discloses control means aimed at suitably maintaining the operating conditions of the engine, the means setting the rate of increase in engine output power (called the rate of increase hereunder) to a predetermined value to perform control in such a manner that the upper limit of engine output power obtained from the rate of increase will not be exceeded by the demanded power of the hydraulic pump (specifically, the excess in power will be compensated by the output power of the motor generator).

PRIOR ART DOCUMENTS

Patent Documents

Patent Document 1: JP-2007-247230-A
Patent Document 2: JP-2009-216058-A

SUMMARY OF THE INVENTION

Problem to be Solved by the Invention

However, the hybrid construction machine described in JP-2007-247230-A does not necessarily give sufficient consideration to the rate of change in the supplied power and consumed power, entailing the possibility that when either the hydraulic pump or the electrical motor has started to operate earlier than the other component, an increase in the consumed power of the other component leading to a deficiency of the total supplied power may trigger an abrupt drop in the power of the component operating earlier. If transposed to the wheel loader, this characteristic would manifest itself in such a manner that when a hydraulic actuator of the wheel loader is operated during traveling, a sudden drop may occur in traveling power unlike with conventional wheel loaders. This can result in worsening of ride comfort.

Also, a hybrid construction machine equipped with the control means disclosed by JP-2009-216058-A is described therein in connection with scenes in which the motor generator is used primarily as an engine assist electrical motor. The patent document does not necessary offer an exhaustive description of scenes in which the hydraulic pump and electrical motor would operate in compound motion.

An object of the present invention is to provide a work vehicle capable of suppressing the worsening of ride comfort attributable to the distribution of power between the hydraulic pump and the electrical motor.

Means for Solving the Problem

In achieving the above-mentioned object, the present invention provides a work vehicle including an engine, a hydraulic pump connected mechanically to the engine, a motor generator connected mechanically to the engine, a traveling motor connected electrically to the motor generator, an electrical storage device connected electrically to the motor generator and the traveling motor, and control means which controls the power of the hydraulic pump and that of the traveling motor. The control means calculates demanded hydraulic power demanded by the hydraulic pump and the demanded traveling power demanded by the traveling motor. If the total value of the demanded hydraulic power and the demanded traveling power is larger than the sum of the engine power that can be output by the engine, and the discharge power that can be discharged by the electrical storage device, then the control means increases the actual power of the hydraulic pump from the value at the time of demand toward the demanded hydraulic power, an increment of the actual power of said hydraulic pump being limited in an orderly manner, and, while the increment of the actual power of the hydraulic pump is being limited in the orderly manner, decreases the actual power of said traveling motor by a value which is equal to or lower than the magnitude of the limited increment of the actual power of the hydraulic pump According to the present invention, it is possible to suppress the worsening of ride comfort attributable to the distribution of power between the hydraulic pump and the traveling motor.

MODES FOR CARRYING OUT THE INVENTION

Figure 1:
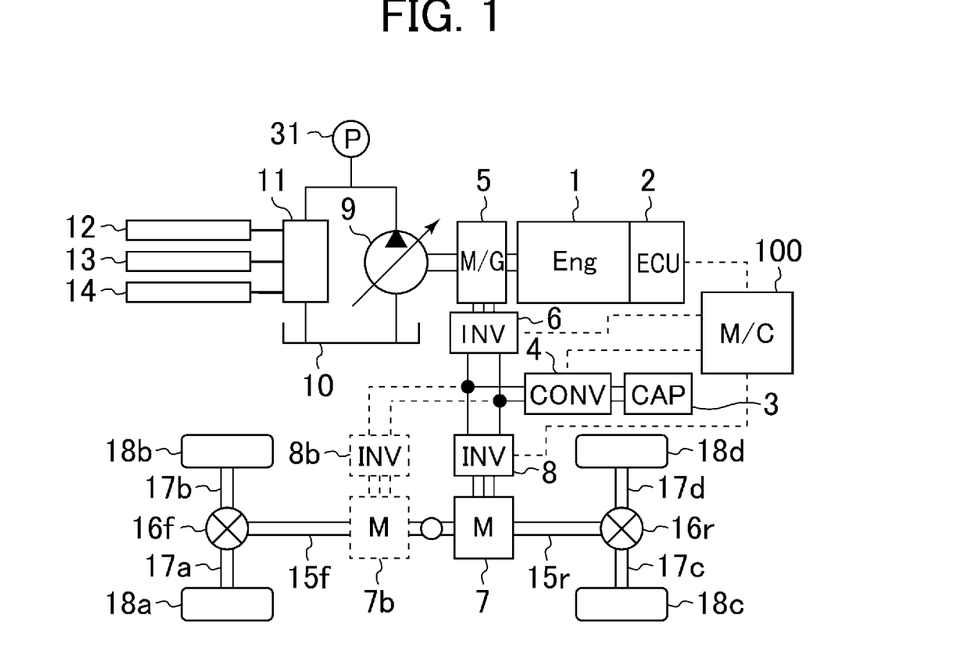
FIG. 1 is a block diagram of a work vehicle according to an embodiment of the present invention.

Some embodiments of the present invention are explained below with reference to the accompanying drawings. FIG. 1 is a block diagram of a work vehicle as one embodiment of the invention.

The work vehicle shown in FIG. 1 includes a main controller (main control unit) 100, an engine 1, an engine controller (engine control unit) 2 that controls the engine 1, a capacitor 3 acting as an electrical storage device, a converter 4 that controls charging and discharging of the capacitor 3, a motor generator 5 connected mechanically to the engine 1 and connected electrically to the capacitor 3, a generator inverter 6 that drives the motor generator 5, traveling motors 7 and 7b that are connected electrically to the motor generator 5 and capacitor 3 and run on electrical power supplied therefrom, and traveling inverters 8 and 8b that control driving of the traveling motors 7 and 7b respectively.

Also, the work vehicle of this embodiment includes a main pump (hydraulic pump) 9 connected mechanically to the engine 1 and motor generator 5, an oil tank 10 that supplies a fluid to the main pump 9, a control valve 11 that distributes the fluid delivered by the main pump 9; and a steering cylinder (hydraulic cylinder) 12, a lift cylinder (hydraulic cylinder) 13, and a bucket cylinder (hydraulic cylinder) 14 each extended and contracted by the fluid distributed by the control valve 11.

In this structure, the converter 4, generator inverter 6, and traveling inverters 8 and 8b are connected to the same electrical power line and can exchange power therebetween. The converter 4 monitors the direct current (DC) voltage of a smoothing capacitor, not shown, attached to the electrical power line, and causes the capacitor 3 to charge and discharge so as to keep the DC voltage of the smoothing capacitor constant.

The main pump 9 is a variable displacement hydraulic pump. The displacement of the main pump 9 can be varied by a tilting angle control valve, not shown, so as to control the discharge flow with regard to revolution speed.

Also in this structure, the electrical motors 7 and 7b as well as the traveling inverters 8 and 8b are shown provided in pairs. Alternatively, there may be provided one electrical motor and one traveling inverter, or four electrical motors and four traveling inverters regarding this invention; there is no limit on the number of each of these components. The ensuing paragraphs will discuss a structure that contains one electrical motor 7 and one traveling inverter 8 for purpose of simplification and illustration.

Upon acceleration during traveling, the traveling inverter 8 causes the traveling motor 7 to run on power. The power running torque generated by the traveling motor 7 is transmitted to tires 18a, 18b, 18c, and 18d via propeller shafts 15f and 15r, differential gears 16f and 16r, and drive shafts 17a, 17b, 17c, and 17d to accelerate the vehicle. Upon braking during traveling, the traveling inverter 8 drives the traveling motor 7 as a motor generator to generate regenerative torque that is transmitted to the tires 18a, 18b, 18c, and 18d in the same manner as the power running torque, whereby the vehicle is decelerated. The regenerative electrical power generated by the traveling motor 7 is usually charged into the capacitor 3. Furthermore, the work vehicle of this embodiment is equipped with hydraulic brake control valves and hydraulic brakes, not shown, so that the vehicle may also be decelerated using the hydraulic brakes as needed.

Figure 2:
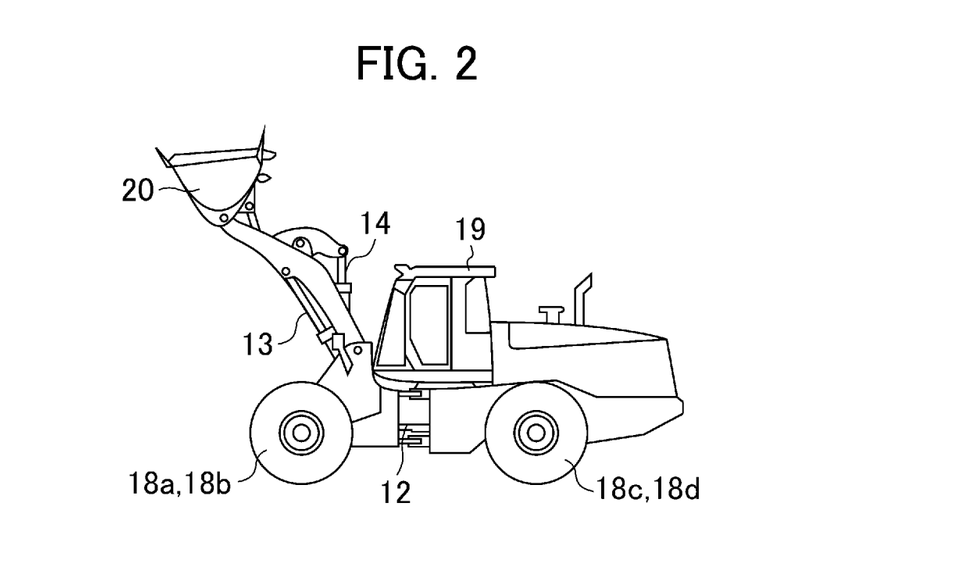
FIG. 2 is a side view of the work vehicle according to the embodiment of the invention.

FIG. 2 is a side view of the work vehicle as the embodiment of the invention. An operator on board a cabin 19 may operate an accelerator pedal, a brake pedal, and a forward/reverse switch, all not shown, to drive the tires 18a, 18b, 18c, and 18d in order to run the vehicle. Also, the operator may operate the steering wheel, not shown, to extend or contract the steering cylinder 12 to adjust the refracting angle of the vehicle and thereby swing the vehicle. Furthermore, the operator may operate a lift lever and a bucket lever, not shown, to extend or contract the lift cylinder 13 and bucket cylinder 14 to adjust the height and tilt of a bucket 20 for excavation and cargo handling operations.

Figure 3:
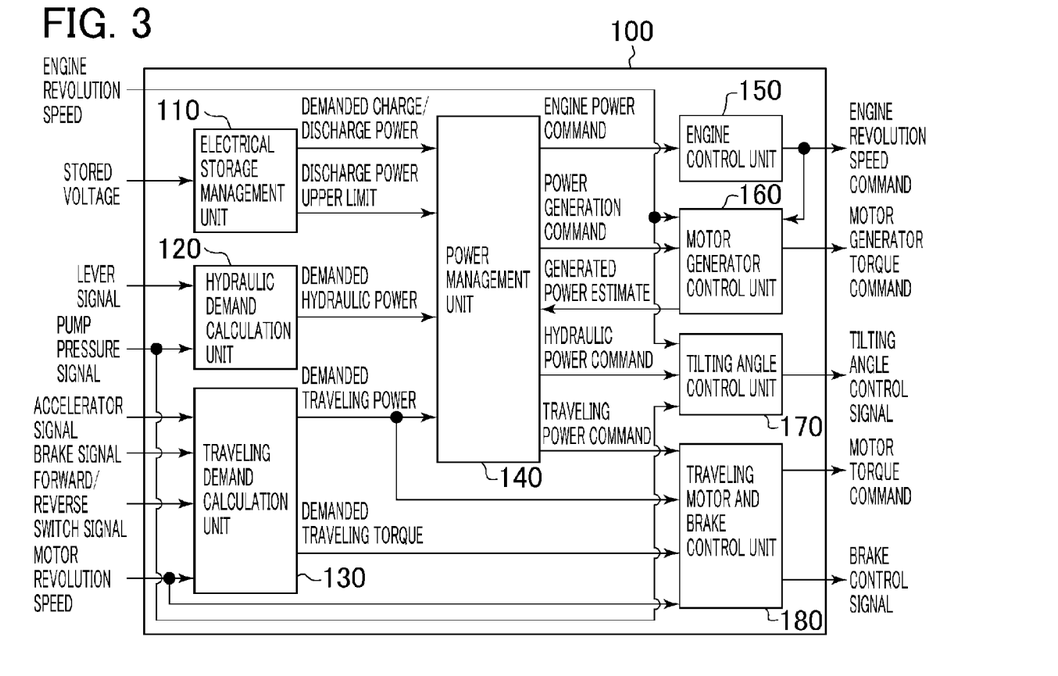
FIG. 3 is a block diagram of a main controller 100 according to the embodiment of the invention.

FIG. 3 shows a structure of the main controller (main control unit) 100. The main controller 100 is made up of an electrical storage management unit 110, a hydraulic demand calculation unit 120, a traveling demand calculation unit 130, a power management unit 140, an engine control unit 150, a motor generator control unit 160, a tilting angle control unit 170, and a traveling motor and brake control unit 180.

The electrical storage management unit 110 receives a stored voltage from the capacitor 3 via the converter 4 and, using known PI control, calculates demanded charge/discharge power $P_{wr\_Cap\_Req}$ so that the stored voltage will coincide with a target voltage. It should be noted that the target voltage is set below the withstand voltage of the capacitor. Also, the electrical storage management unit 110 calculates an upper limit of the discharge power (discharge power upper limit) that can be discharged by the capacitor 3, using the stored voltage and a discharge power upper limit map.

Figure 4:
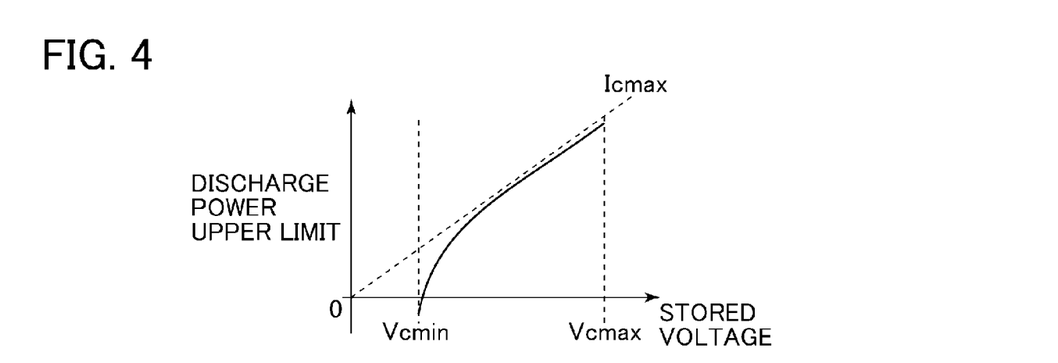
FIG. 4 is a typical discharge power upper limit map according to the embodiment of the invention.

FIG. 4 shows a typical discharge power upper limit map. $V_{cmin}$ and $V_{cmax}$ denote a minimum voltage and a maximum voltage, respectively, indicating the range of use in which the capacitor 3 resists deterioration. The discharge power upper limit map is set in such a manner that the discharge power upper limit remains under zero near the minimum voltage $V_{cmin}$ to keep the stored voltage from dropping below the minimum voltage $V_{cmin}$ in normal operation. Meanwhile, $I_{cmax}$ represents a line based on a maximum current limit on the converter 4. The discharge power upper limit map is set so that the lower the stored voltage, the lower the discharge power upper limit is determined to keep a discharge current from exceeding the maximum current limit.

The hydraulic demand calculation unit 120 receives a lever signal from the lift lever and bucket lever and a discharge pressure of the pump 9 (pump pressure signal) acquired by a pressure sensor (pressure acquisition means) 31 interposed between the hydraulic pump 9 and the control valve 11, and calculates a demanded pump flow and demanded hydraulic power accordingly. It is assumed here that the operation of the steering wheel and that of the steering cylinder 12 are not included in the calculations for purpose of simplification and illustration.

Figure 5:
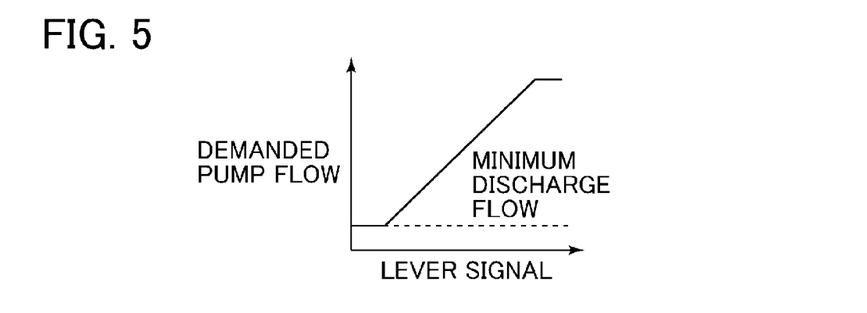
FIG. 5 is a typical demanded pump flow map according to the embodiment of the invention.

First, the hydraulic demand calculation unit 120 calculates the demanded pump flow from the lever signal using a demanded pump flow map. FIG. 5 shows a typical demanded pump flow map. As shown in FIG. 5, the demanded pump flow map is set so that the demanded pump flow is approximately proportional to the lever signal. Then the demanded hydraulic power $P_{wr\_Pmp\_Req}$ is calculated from the demanded pump flow $q_{Pmp\_Req}$ and the pump pressure $P_{rs\_Pmp}$ from the pressure sensor 31, using the expression given below. It should be noted here that the efficiency of the hydraulic pump 9 is not included in the computation expression immediately below and will not be included in all subsequent computations for purpose of simplification and illustration.

[Math. 1]

$$P_{wr\_Pmp\_Req} = q_{Pmp\_Req} \cdot P_{rs\_Pmp} \tag{1}$$

Figure 6:
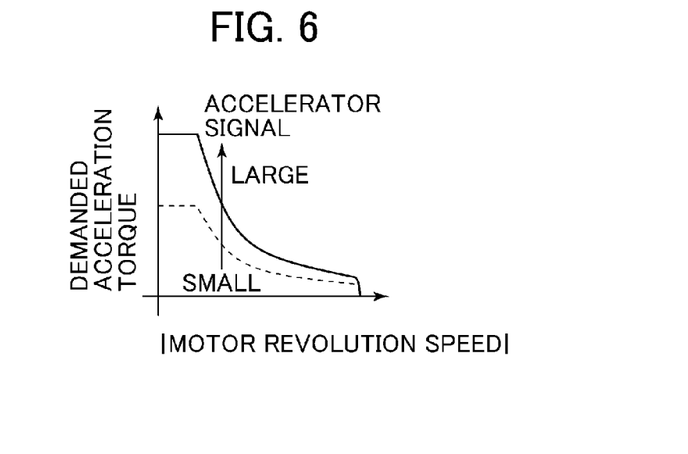
FIG. 6 is a typical demanded acceleration torque map according to the embodiment of the invention.

The traveling demand calculation unit 130 receives a forward/reverse switch signal from the forward/reverse switch, an accelerator signal from the accelerator pedal, a brake signal from the brake pedal, and the revolution speed of the traveling motor 7 as the motor revolution speed from the inverter (revolution speed acquisition means) 8, and calculates demanded traveling torque and demanded traveling power accordingly. First, demanded acceleration torque is calculated from the accelerator signal and motor revolution speed using a predetermined demanded acceleration torque map. FIG. 6 shows a typical demanded acceleration torque map. The demanded acceleration torque map is set so that on the basis of a maximum torque curve of the traveling motor 7, the demanded acceleration torque becomes proportional to the accelerator signal and inversely proportional to the absolute value of the motor revolution speed. Then the demanded traveling torque $T_{rq\_Drv\_Req}$ is calculated from the demanded acceleration torque $T_{rq\_Acc}$, forward/reverse switch signal $V_{FNR}$, motor revolution speed $N_{Mtr}$, and brake signal $V_{Brk}$ using the following expression:

[Math. 2]

$$T_{rq\_Drv\_Req} = \text{sign}(V_{FNR}) \cdot T_{rq\_Acc} - \text{sign}(N_{Mtr}) \cdot K_{Brk} \cdot V_{Brk} \tag{2}$$

In the expression (2) above, "sign" denotes a signum function that returns 1 if the argument is positive, −1 if the argument is negative, and 0 if the argument is 0. The forward/reverse switch signal $V_{FNR}$ indicates 1 if the forward/reverse switch is set to forward, −1 if the switch is set to reverse, and 0 if the switch is set to neutral. Also, $K_{Brk}$ stands for a proportionality constant that is predetermined in such a manner that operating the brake pedal brings about deceleration without excess or deficiency.

And the demanded traveling power $P_{wr\_Drv\_Req}$ is calculated from the demanded traveling torque $T_{rq\_Req}$ and motor revolution speed $N_{Mtr}$ using the following expression:

[Math. 3]

$$P_{wr\_Drv\_Req} = T_{rq\_Req} \cdot N_{Mtr} \tag{3}$$

The power management unit 140 receives demanded charge/discharge power and a discharge power upper limit from the electrical storage management unit 110, demanded hydraulic power from the hydraulic demand calculation unit 120, demanded traveling power from the traveling demand calculation unit 130, and a generated power estimate from the motor generator control unit 160, and calculates a hydraulic power command, a traveling power command, a power generation command, and an engine power command accordingly. The calculations performed by the power management unit 140 will be discussed later in detail.

Based on the engine power command, the engine control unit 150 calculates an operating point where engine efficiency is the highest using an engine fuel efficiency map. The engine revolution speed is computed at that operating point as an engine revolution speed command.

The motor generator control unit 160 calculates a motor generator torque command $T_{rq\_Gen\_t}$ from the engine revolution speed $N_{Eng}$, power generation command $P_{wr\_Gen\_Ref}$, and engine revolution speed command $N_{Eng\_t}$ using the expression below, and transmits the calculated command to the generator inverter.

[Math. 4]

$$T_{rq\_Gen\_t} = \max\{K_{eng}(N_{Eng\_t} - N_{Eng}), 0\} - \frac{P_{wr\_Gen\_Ref}}{N_{eng}} \tag{4}$$

In the expression (4) above, $K_{Eng}$ denotes a proportional gain regarding the deviation of the engine revolution speed. A positive sign of the power generation command $P_{wr\_Gen\_Ref}$ specifies that the motor generator 5 is to generate power, its negative sign specifying that the motor generator 5 is to run on power.

Next, the generated power estimate is calculated from the engine revolution speed $N_{Eng}$ and motor generator torque command $T_{rq\_Gen\_t}$ using the following expression:

[Math. 5]

$$P_{wr\_Gen} = N_{Eng} \cdot T_{rq\_Gen\_t} \tag{5}$$

The tilting angle control unit 170 calculates a tilting angle control signal $V_{DP\_t}$ using the engine revolution speed $N_{Eng}$, hydraulic power command $P_{wr\_Pmp\_Ref}$, and pump pressure $P_{rs\_Pmp}$, and drives the tilting angle control valve of the hydraulic pump 9 in accordance with the tilting angle control signal $V_{Dp\_t}$. It should be noted that in the expression below, $K_{Dp}$ denotes a proportionality constant, and the pump pressure $P_{rs\_Pmp}$ is a value input from the pressure sensor 31.

As indicated by the expression below, the tilting angle control signal $V_{Dp\_t}$ is smaller the higher the pump pressure $P_{rs\_Pmp}$ provided the engine revolution speed $N_{Eng}$ and hydraulic power command $P_{wr\_Pmp\_Ref}$ are constant. Thus the displacement of the hydraulic pump 9 is controlled to be smaller the higher the pump pressure $P_{rs\_Pmp}$ becomes.

[Math. 6]

$$V_{Dp\_t} = K_{Dp} \frac{P_{wr\_Pmp\_Ref}}{P_{rs\_Pmp} \cdot N_{eng}} \quad (6)$$

The traveling motor and brake control unit 180 calculates a traveling motor torque command $T_{rq\_Mtr\_t}$ and transmits the calculated command to the traveling inverter 8. With this embodiment, the traveling motor torque command $T_{rq\_Mtr\_t}$ is calculated from the traveling power command $P_{wr\_Drv\_Ref}$, demanded traveling power $P_{wr\_Drv\_Req}$, and demanded traveling torque $T_{rq\_Drv\_Req}$ using the expression below. In the expression below, $R_D$ denotes the reduction ratio of the differential gear 16. Also, when the demanded traveling power $P_{wr\_Drv\_Req}$ is 0, the traveling motor torque command $T_{rq\_Mtr\_t}$ is assumed to be 0.

[Math. 7]

$$T_{rq\_Mtr\_t} = \frac{T_{rq\_Drv\_Req}}{R_D} \frac{P_{wr\_Drv\_Ref}}{P_{wr\_Drv\_Req}} \quad (7)$$

Substituting the expression (3) for the demanded traveling torque $T_{rq\_Req}$ in the expression (7) immediately above provides the expression below. Thus the traveling motor torque command $T_{rq\_Mtr\_t}$ is smaller the higher the motor revolution speed $N_{Mtr}$ provided the traveling power command $P_{wr\_Drv\_Ref}$ is constant. In this manner, the torque of the traveling motor 5 is controlled to be smaller the higher the motor revolution speed $N_{Mtr}$ becomes.

[Math. 8]

$$T_{rq\_Mtr\_t} = \frac{1}{R_D} \frac{P_{wr\_Drv\_Ref}}{N_{Mtr}} \quad (8)$$

Next, a brake control signal $V_{Brk\_t}$ is calculated from the motor revolution speed $N_{Mtr}$, demanded traveling torque $T_{rq\_Drv\_Req}$, and traveling torque command $T_{rq\_Mtr\_t}$ using the expression below, so that the hydraulic brake control valves (not shown) are driven accordingly. In the expression below, $K_{Brk}$ denotes a proportionality constant.

[Math. 9]

$$V_{Brk\_t} = K_{Brk} \cdot \max\{-\text{sign}(N_{Mtr}) \cdot (T_{rq\_Drv\_Req} - R_D \cdot T_{rq\_Mtr\_t}), 0\} \quad (9)$$

Figure 7:
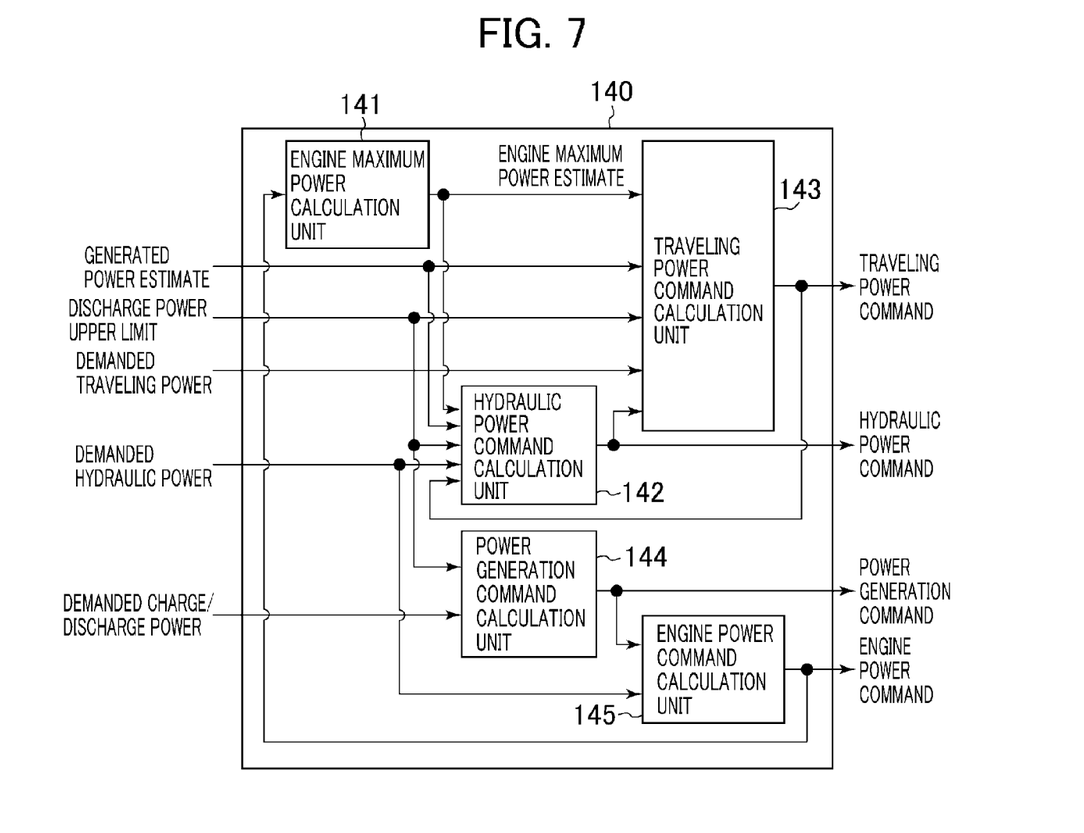
FIG. 7 is a block diagram of a power management unit 140 according to the embodiment of the invention.

FIG. 7 shows a structure of the power management unit 140. The power management unit 140 is made up of an engine maximum power calculation unit 141, a hydraulic power command calculation unit 142, a traveling power command calculation unit 143, a power generation command calculation unit 144, and an engine power command calculation unit 145.

The engine maximum power calculation unit 141 is a part that calculates maximum power that can be output by the engine 1 (engine maximum power). With this embodiment, an engine maximum power estimate $P_{wr\_Eng\_Max}$ calculated by getting the engine power command $P_{wr\_Eng\_Ref}$ filtered through a known low-pass filter is used as the engine maximum power. Incidentally, the engine power command $P_{wr\_Eng\_Ref}$ calculated by the engine power command calculation unit 145 one control cycle earlier is used in this calculation. The time constant of the low-pass filter is determined in keeping with the response characteristics of the engine. Although the engine maximum power estimate $P_{wr\_Eng\_Max}$ is calculated here using the engine power command $P_{wr\_Eng\_Ref}$ one control cycle earlier, the engine maximum power estimate $P_{wr\_Eng\_Max}$ may be calculated alternatively from the engine revolution speed $N_{Eng}$ and a fuel injection quantity of the engine. As another alternative, the engine maximum power estimate $P_{wr\_Eng\_Max}$ may be calculated from the engine power command $P_{wr\_Eng\_Ref}$ one control cycle earlier and the engine maximum power estimate $P_{wr\_Eng\_Max}$ using the following expression:

[Math. 10]

$$P_{wr\_Eng\_Max} = \min(P_{wr\_Eng\_Ref}, P_{wr\_Eng\_Max} + dP_{wr\_Eng\_Up}) \quad (10)$$

In the expression (10) above, the engine maximum power estimate $P_{wr\_Eng\_Max}$ on the right side is also a value one control cycle earlier. Further, $dP_{wr\_Eng\_Up}$ denotes the maximum value of an engine power increase during one control cycle (engine power increase maximum value). The engine power increase maximum value is obtained by multiplying a maximum value of the rate of increase in the power of the engine 1 (engine power increase rate maximum value (Ve)) by the unit control cycle (i.e., engine power increase maximum value=engine power increase rate maximum value×unit control cycle). As such, the engine power increase maximum value is set in keeping with the response characteristics of the engine.

The hydraulic power command calculation unit 142 calculates the hydraulic power command $P_{wr\_Eng\_Ref}$ from the engine maximum power estimate $P_{wr\_Eng\_Max}$, discharge power upper limit $P_{wr\_Cap\_Max}$ demanded traveling power $P_{wr\_Drv\_Req}$ demanded hydraulic power $P_{wr\_Pmp\_Req}$ and traveling power command $P_{wr\_Drv\_Ref}$. The calculations performed by the hydraulic power command calculation unit 142 will be discussed later in detail.

The traveling power command calculation unit 143 calculates the traveling power upper limit $P_{wr\_Drv\_Max}$ from the engine maximum power estimate $P_{wr\_Eng\_Max}$, discharge power upper limit $P_{wr\_Cap\_Max}$, and hydraulic power command $P_{wr\_Pmp\_Ref}$ using the following expression:

[Math. 11]

$$P_{wr\_Drv\_Max} = P_{wr\_Eng\_Max} - P_{wr\_Pmp\_Ref} + P_{wr\_Cap\_Max} \quad (11)$$

Alternatively, the traveling power upper limit $P_{wr\_Drv\_Max}$ may be calculated from the generated power estimate $P_{wr\_Gen}$ and discharge power upper limit $P_{wr\_Cap\_Max}$ using the following expression:

[Math. 12]

$$P_{wr\_Drv\_Max} = P_{wr\_Gen} + P_{wr\_Cap\_Max} \quad (12)$$

Here, the power acquired by subtracting the consumed power of the hydraulic pump 9 (hydraulic power command $P_{wr\_Pmp\_Ref}$) from the output power of the engine 1 (engine maximum power estimate $P_{wr\_Eng\_Max}$) is used as the generated power (generated power estimate $P_{wr\_Gen}$), that the two immediately preceding expressions are equivalent to each other. The output power of the engine 1 is thus consumed preferentially by the hydraulic pump 9 rather than by the motor generator 5 (traveling motor 7). Next, the traveling power command $P_{wr\_Drv\_Ref}$ is calculated from the demanded traveling power $P_{wr\_Drv\_Req}$ and traveling power upper limit $P_{wr\_Drv\_Max}$ us using the expression below. That is, the smaller of the demanded traveling power $P_{wr\_Drv\_Req}$ and the traveling power upper limit $P_{wr\_Drv\_Max}$ is used as the traveling power command $P_{wr\_Drv\_Ref}$. The traveling power command $P_{wr\_Drv\_Ref}$ thus calculated is output to the traveling motor and brake control unit 180.

[Math. 13]

$$P_{wr\_Drv\_Ref} = \min(P_{wr\_Drv\_Req}, P_{wr\_Drv\_Max}) \qquad (13)$$

The power generation command calculation unit 144 calculates the power generation command $P_{wr\_Gen\_Ref}$ from the demand traveling power $P_{wr\_Drv\_Req}$ and demanded charge/discharge power $P_{wr\_Cap\_Req}$ using the expression below. In the following expression, the demanded charge/discharge Power $P_{wr\_Cap\_Req}$ represents a discharge when its value is positive and a charge when negative:

[Math. 14]

$$P_{wr\_Gen\_Ref} = \max(P_{wr\_Drv\_Req}, 0) - P_{wr\_Cap\_Req} \qquad (14)$$

The engine power command calculation unit 145 calculates the engine power command $P_{wr\_Eng\_Ref}$ from the power generation command $P_{wr\_Gen\_Ref}$ and demanded hydraulic power $P_{wr\_Pmp\_Req}$ using the following expression:

[Math. 15]

$$P_{wr\_Eng\_Ref} = P_{wr\_Gen\_Ref} + P_{wr\_Pmp\_Req} \qquad (15)$$

Figure 8:
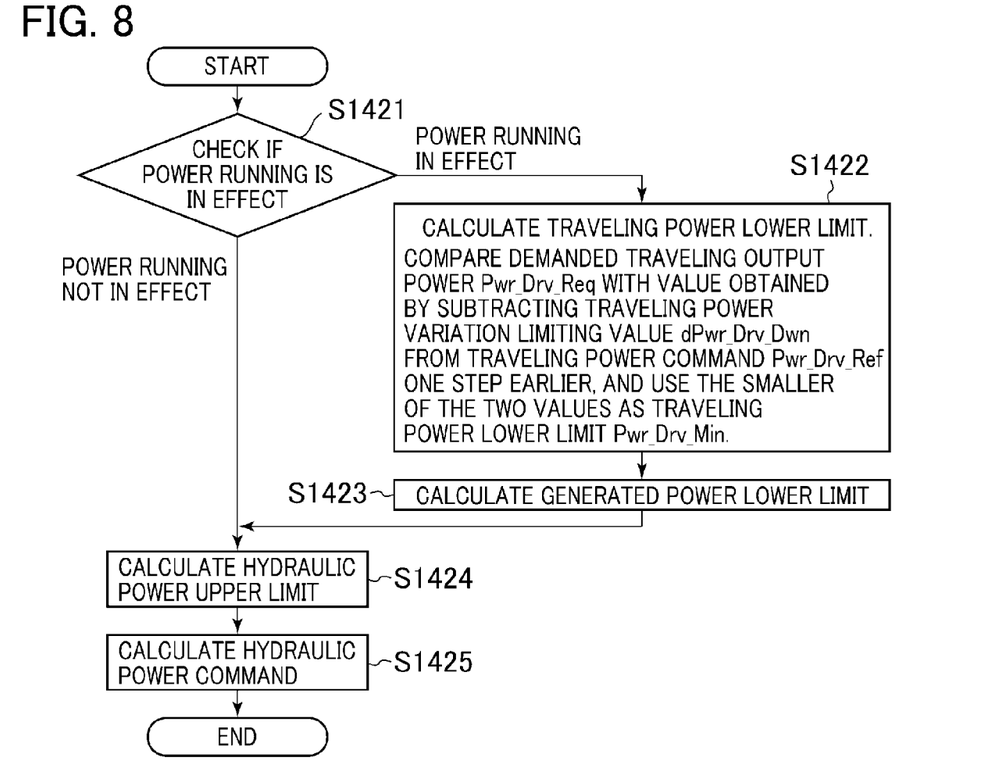
FIG. 8 is a flowchart of calculations performed by a hydraulic power command calculation unit 142 according to part of the embodiment of the invention.

The calculations performed by the hydraulic power command calculation unit 142 are explained below in detail with reference to the flowchart shown in FIG. 8.

In step 1421, it is determined whether power running is in effect. If the demanded traveling power $P_{wr\_Drv\_Req}$ (see the expression (3) above) is a positive value in step 1421, power running is determined to be in effect and step 1422 is reached. If the demanded traveling power $P_{wr\_Drv\_Req}$ is a negative value, power running is determined not to be in effect and step 1424 is reached.

In step 1422, the traveling power lower limit $P_{wr\_Drv\_Min}$ is calculated as the lower limit of the actual power (traveling power) of the traveling motor 7. With this embodiment, the traveling power lower limit $P_{wr\_Drv\_Min}$ is calculated from the demanded traveling power $P_{wr\_Drv\_Req}$ and traveling power command $P_{wr\_Drv\_Ref}$ using the expression below. That is, a comparison is made between the demanded traveling power $P_{wr\_Drv\_Req}$ on the one hand, and the value obtained by subtracting a traveling power variation limiting value $dP_{wr\_Drv\_Dwn}$ from the traveling power command $P_{wr\_Drv\_Ref}$ one control cycle earlier on the other hand, and the smaller of the two values is used as the traveling power lower limit $P_{wr\_Drv\_Min}$. It should be noted that the traveling power command $P_{wr\_Drv\_Ref}$ is a value calculated by the traveling power command calculation unit 143 one control cycle earlier and that $dP_{wr\_Drv\_Dwn}$ represents the value by which the traveling power command is lowered during one control cycle (traveling power variation limiting value). This traveling power variation limiting value is obtained by multiplying the limiting value set on the rate of decrease in traveling power (traveling power change rate limiting value (Vm)) by the unit control cycle (i.e., traveling power variation limiting value=traveling power change rate limiting value× unit control cycle time). As such, the traveling power variation limiting value is determined so that the operator will not feel worsened ride comfort upon deceleration of the vehicle attributable to lever operations during traveling.

[Math. 16]

$$P_{wr\_Drv\_Min} = \min(P_{wr\_Drv\_Req}, P_{wr\_Drv\_Ref} - dP_{wr\_Drv\_Dwn}) \qquad (16)$$

As a result, the traveling power lower limit $P_{wr\_Drv\_Min}$ of this embodiment is lowered by as much as the traveling power variation limiting value $dP_{wr\_Drv\_Dwn}$ than the traveling power command one control cycle earlier, except when the demanded traveling power is significantly decreased. That is, the traveling power lower limit $P_{wr\_Drv\_Min}$ is reduced by as much as the traveling power variation limiting value $dP_{wr\_Drv\_Dwn}$ in each control cycle. When the calculation of the traveling power lower limit $P_{wr\_Drv\_Min}$ is completed, step 1423 is reached.

In step 1423, a generated power lower limit $P_{wr\_Gen\_Min}$ is calculated. With this embodiment, the generated power lower limit $P_{wr\_Gen\_Min}$ is calculated from the traveling power lower limit $P_{wr\_Drv\_Min}$ and discharge power upper limit $P_{wr\_Cap\_Max}$ using the expression below. When the calculation of the generated power lower limit $P_{wr\_Gen\_Min}$ is completed, step 1424 is reached.

[Math. 17]

$$P_{wr\_Gen\_Min} = \max(P_{wr\_Drv\_Min} - P_{wr\_Cap\_Max}, 0) \qquad (17)$$

In step 1424, a hydraulic power upper limit $P_{wr\_Pmp\_Max}$ is calculated as the upper limit of the actual power of the hydraulic pump 9 (hydraulic power). With this embodiment, the hydraulic power upper limit $P_{wr\_Pmp\_Max}$ is calculated from the engine maximum power estimate $P_{wr\_Eng\_Max}$ and generated power lower limit $P_{wr\_Gen\_Min}$ using the expression below. That is, the hydraulic power upper limit $P_{wr\_Pmp\_Max}$ is obtained by subtracting the generated power lower limit $P_{wr\_Gen\_Min}$ from the engine maximum power estimate $P_{wr\_Eng\_Max}$. When the calculation of the hydraulic power upper limit $P_{wr\_Pmp\_Max}$ is completed, step 1425 is reached.

[Math. 18]

$$P_{wr\_Pmp\_Max} = P_{wr\_Eng\_Max} - P_{wr\_Gen\_Min} \qquad (18)$$

It should be noted that when power running is not in effect (i.e., when step 1424 is reached directly from step 1421), the generated power lower limit $P_{wr\_Gen\_Min}$ in the expression (18) above is assumed to be 0 because the generated power lower limit $P_{wr\_Gen\_Min}$ is not calculated.

In step 1425, the hydraulic power command $P_{wr\_Pmp\_Ref}$ is calculated. With this embodiment, the hydraulic power command $P_{wr\_Pmp\_Ref}$ is calculated from the demanded hydraulic power $P_{wr\_Pmp\_Req}$ and hydraulic power upper limit $P_{wr\_Pmp\_Max}$ using the expression below. That is, the smaller of the demanded hydraulic power $P_{wr\_Pmp\_Req}$ and the hydraulic power upper limit $P_{wr\_Pmp\_Max}$ is selected as the hydraulic power command $P_{wr\_Pmp\_Ref}$.

[Math. 19]

$$P_{wr\_Pmp\_Ref} = \min(P_{wr\_Pmp\_Req}, P_{wr\_Pmp\_Max}) \qquad (19)$$

Here, on the assumption that the demanded traveling power is a sufficiently large value, the expressions (16) through (18) above may be rearranged into the expression below. The expression then indicates that the hydraulic power upper limit $P_{wr\_Pmp\_Max}$ is calculated by first subtracting the traveling power command $P_{wr\_Drv\_Ref}$ one control cycle earlier from the sum of the engine maximum power estimate $P_{wr\_Eng\_Max}$ and discharge power upper limit $P_{wr\_Cap\_Max}$ and by adding the traveling power variation limiting value $dP_{wr\_Drv\_Dwn}$ to the difference from the subtraction.

[Math. 20]

$$P_{wr\_Pmp\_Max} = P_{wr\_Eng\_Max} + P_{wr\_Cap\_Max} - P_{wr\_Drv\_Ref} + dP_{wr\_Drv\_Dwn} \quad (20)$$

That is, the hydraulic power command $P_{wr\_Pmp\_Ref}$ at this point (i.e., hydraulic power upper limit $P_{wr\_Pmp\_Max}$ (see the expression (19) above) is increased by as much as the traveling power variation limiting value $dP_{wr\_Drv\_Dwn}$ in each control cycle. On the other hand, the traveling power command $P_{wr\_Drv\_Ref}$ (i.e., traveling power upper limit $P_{wr\_Drv\_Max}$ (see the expression (13) above) is decreased by as much as the traveling power variation limiting value $dP_{wr\_Drv\_Dwn}$ in each control cycle, because the value obtained by subtracting the hydraulic power command $P_{wr\_Pmp\_Ref}$ from the sum of the engine maximum power estimate $P_{wr\_Eng\_Max}$ and discharge power upper limit $P_{wr\_Cap\_Max}$ is allocated, as can be seen in the expression (11) above.

According to this embodiment, as discussed above, when lever operations are performed (work that involves driving the hydraulic cylinders 13 and 14) during power running, the traveling power variation limiting value $dP_{wr\_Drv\_Dwn}$ is adjusted in such a manner that hydraulic power is gradually increased while traveling power is gradually decreased, which protects the operator from feeling a sense of discomfort. At this point, the traveling power variation limiting value should preferably coincide with the variation of traveling power in effect when similar operations are carried out on a typical torque converter-equipped vehicle (conventional vehicle). When hydraulic power and traveling power are controlled in the manner described above, a sudden drop in traveling power not intended by the operator is averted. If the stored voltage in the capacitor 3 is high, the discharge power upper limit is also high, so that hydraulic power may be raised as soon as possible.

Figure 9A:
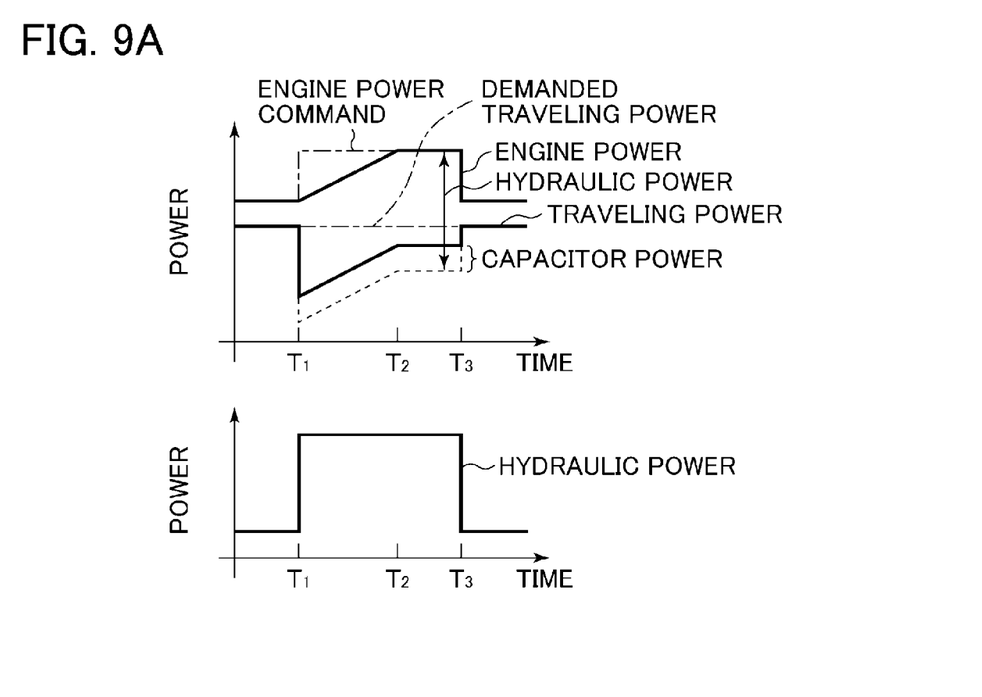
FIG. 9A is an illustration for explaining the workings of a work vehicle according to a comparative example to the embodiment of the invention.
Figure 9B:
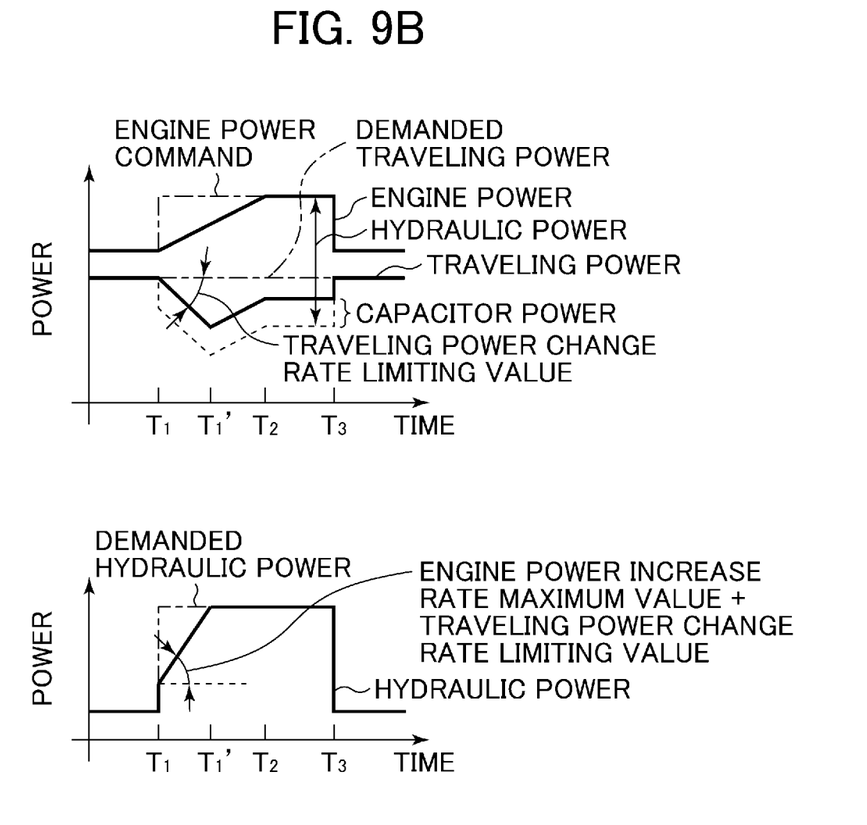
FIG. 9B is an illustration for explaining the workings of the work vehicle according to the embodiment of the invention.

Explained next with reference to FIGS. 9A and 9B is how the work vehicle of this embodiment operates. FIG. 9A shows an example (comparative example) in which the rate of change in traveling power (rate of decrease) is not taken into account (where this invention is not applied). FIG. 9B indicates an example in which the rate of change in traveling power is taken into consideration (where this invention is applied). The demanded traveling power, discharge power upper limit, and engine power increase rate maximum value (Ve) are assumed to be constant for purpose of simplification and illustration.

The case of FIG. 9A is explained first. It is assumed that at time $T_1$ during power running, lever operations by the operator cause the demanded hydraulic power (hydraulic power) to be raised abruptly in steps and the engine power command to be increased, with the result that the sum of the demanded hydraulic power and demanded traveling power exceeds the sum of the engine maximum power estimate and discharge power upper limit. In this case, traveling power is abruptly decreased because engine power and discharge power are used preferentially as hydraulic power while engine power is raised only gradually despite the presence of assistance by capacitor discharge (discharge power, corresponding to capacitor power in FIG. 9A). After time $T_1$, traveling power is gradually restored in keeping with an increase in engine power. At time $T_2$ where engine power reaches its maximum level (engine power command value), traveling power becomes steady. At time $T_3$ where the operator's lever operations are terminated so that the demanded hydraulic power is lowered and so is hydraulic power accordingly, traveling power is suddenly raised and coincides with the demanded traveling power.

The case of FIG. 9B is explained next. At time $T_1$ where the demanded hydraulic power is raised in steps, the engine power command is increased accordingly as in the case of FIG. 9A. With this embodiment, however, the increase in hydraulic power is limited in such a manner that the magnitude of the increase is reduced over time since the start of the increase. Thus the actual hydraulic power is raised gradually from its value at the time of demand toward the demanded hydraulic power over time. Specifically, the magnitude of the gradient of hydraulic power from time $T_1$ to time $T_1'$ coincides with the sum of the engine power increase rate maximum value Ve and traveling power change rate limiting value Vm. During this period, hydraulic power is gradually increased. On the other hand, from time $T_1$ to time $T_1'$ where hydraulic power is being limited, the actual traveling power drops gradually from the value at the time of demand. At this point, the magnitude of the gradient of traveling power coincides with the traveling power change rate limiting value Vm. Thus this embodiment makes it possible to avoid a sudden drop in traveling power attributable to lever operations during traveling. That in turn suppresses the worsening of the operator's ride comfort in such cases.

Later, when hydraulic power is raised and coincides with the demanded hydraulic power at time $T_1'$, traveling power having been reduced since time $T_1$ is gradually restored. At time $T_2$ where engine power reaches its maximum power level, traveling power becomes steady. At time $T_3$ where the demanded hydraulic power is reduced and so is hydraulic power accordingly, traveling power is raised and coincides with the demanded traveling power.

Also with this embodiment, the discharge power upper limit $P_{wr\_Cap\_Max}$ is added to the hydraulic power command $P_{wr\_Pmp\_Ref}$ (hydraulic power upper limit $P_{wr\_Pmp\_Max}$) as indicated by the expression (20) above. This allows hydraulic power to be increased quickly by as much as the discharge power upper limit, so that the response of hydraulic power can be made as quick as possible.

At time $T_3$ where the demanded hydraulic power drops abruptly, the sudden increase in traveling power can incur the worsening of ride comfort for the operator as shown in FIG. 9A. Thus with this embodiment, as in the case of the drop in traveling power discussed above, an upper limit is also set on the increase in traveling power. For this reason, as shown in FIG. 9B, traveling power may be raised gradually after time $T_3$ until the demanded traveling power is reached. Obviously, it is also possible to set a limiting value on the rate of decrease in hydraulic power in order to limit the rate of increase in traveling power.

With the above-described embodiment, it was explained that hydraulic power is raised by the speed totaling the engine power increase rate maximum value (Ve) and the traveling power change rate limiting value (Vm). Alternatively, hydraulic power may be increased by a value lower than the totaled value. In like manner, whereas it was explained that traveling power is decreased by the speed of the traveling power change rate limiting value (Vm), traveling power may be reduced instead by a speed lower than that limiting value.

Also, for purpose of simplifying control with this embodiment, control is exercised so that the hydraulic power command is increased only by a set value (traveling power variation limiting value $dP_{wr\_Drv\_Dwn}$) in each control cycle and that the traveling power command is lowered by as much as that set value. Alternatively, some other type of limit may be implemented upon increase of the hydraulic power command and upon decrease of the traveling power command. This type of limit may involve defining the magnitude of the traveling power variation limiting value in keeping with the elapsed time since the start of the increase in hydraulic power, or defining the magnitude of the traveling power variation limiting value in accordance with the deviation of the actual power from the demanded hydraulic power.

Furthermore, since this embodiment employs the same set value (traveling power variation limiting value $dP_{wr\_Drv\_Dwn}$) for both the increase in the hydraulic power command and the decrease in the traveling power command, the "magnitude of the increase in the hydraulic power command" is equal to the "magnitude of the decrease in the traveling power command." However, if the "magnitude of the decrease in the traveling power command" is smaller than the "magnitude of the increase in the hydraulic power command," then a power balance may be maintained and the worsening of ride comfort may also be suppressed as with this embodiment. That is, the magnitude of the decrease in the traveling power command need only be smaller than the magnitude of the increase in the hydraulic power command.

Also, the above-described embodiment was shown using the capacitor 3 as the electrical storage device, this is not limitative of the present invention. Alternatively, batteries or some other suitable device may be utilized instead as the electrical storage device.

DESCRIPTION OF REFERENCE NUMERALS

1 Engine
2 Engine controller
3 Capacitor (electrical storage device)
4 Converter
5 Motor generator
6 Generator inverter
7 Traveling motor
8 Traveling inverter
9 Main pump (hydraulic pump)
100 Main controller (control unit)

The invention claimed is:

1. A work vehicle comprising an engine, a hydraulic pump connected mechanically to said engine, a motor generator connected mechanically to said engine, a traveling motor connected electrically to said motor generator, an electrical storage device connected electrically to said motor generator and said traveling motor, and a controller configured to control the power of said hydraulic pump and that of said traveling motor;

wherein said controller is configured to calculate demanded hydraulic power demanded by said hydraulic pump and demanded traveling power demanded by said traveling motor, and wherein, if a total value of said demanded hydraulic power and said demanded traveling power is larger than a sum of an engine power that can be output by said engine, and a discharge power that can be discharged by said electrical storage device, said controller is configured to increase an actual power of said hydraulic pump from a value, at a time of demand, toward said demanded hydraulic power, the actual power of said hydraulic pump being incrementally increased, and, while the actual power of said hydraulic pump is being incrementally increased, decrease an actual power of said traveling motor by a value which is equal to or lower than a magnitude of said incremental increase of the actual power of said hydraulic pump.

2. The work vehicle according to claim 1, wherein, if the total value of said demanded hydraulic power and said demanded traveling power is larger than the sum of said engine power and said discharge power, said controller is configured to increase the actual power of said hydraulic pump from the value at the time of demand toward said demanded hydraulic power at a speed which is equal to or lower than a total value of a maximum value (Ve) of a rate of increase in power of said engine and a limiting value (Vm) set on a rate of decrease in power of said traveling motor (Ve+Vm), and said controller is configured to reduce the actual power of said traveling motor by a speed which is equal to or lower than said limiting value (Vm).

3. The work vehicle according to claim 1, wherein the magnitude of said limited increment of the actual power of said hydraulic pump is decreased in keeping with an increase in elapsed time since the start of the increase in the power of said hydraulic pump.

4. The work vehicle according to claim 2, wherein said engine power is engine maximum power that can be output by said engine;

wherein said discharge power is a discharge power upper limit that can be discharged by said electrical storage device, and wherein said engine maximum power and said discharge power upper limit are calculated by said controller.

5. The work vehicle according to claim 4, wherein said hydraulic pump is a variable displacement pump;

wherein, if the total value of said demanded hydraulic power and said demanded traveling power is larger than the sum of said engine maximum power and said discharge power upper limit, said controller is configured to subtract a power command for said traveling motor calculated one control cycle earlier from the total value of said engine maximum power and said discharge power upper limit and adds said limiting value to the difference from a subtraction to obtain a hydraulic power upper limit of said hydraulic power, said controller further performing control in such a manner that the higher a discharge pressure of said hydraulic pump, the smaller a displacement of said hydraulic pump becomes so that the actual power of said hydraulic pump is held at a value which is equal to or lower than said hydraulic power upper limit, and wherein said controller is configured to subtract the actual power of said hydraulic pump from the total value of said engine maximum power and said discharge power upper limit to obtain a traveling power upper limit of said traveling motor, and to further perform control in such a manner that the higher a revolution speed of said traveling motor becomes, the smaller a torque of said traveling motor becomes so that the actual power of said traveling motor is held at a value which is equal to or lower than said traveling power upper limit.

\* \* \* \* \*